(12) United States Patent
Hasei (10) Patent No.: US 7,393,130 B2
(45) Date of Patent: Jul. 1, 2008

(54) OPTICAL SUBSTRATE, MANUFACTURING METHOD THEREOF, PLANAR LIGHTING DEVICE AND ELECTROOPTICAL DEVICE

(75) Inventor: Hironori Hasei, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/423,729

(22) Filed: Jun. 13, 2006

(65) Prior Publication Data

US 2007/0002205 A1 Jan. 4, 2007

(30) Foreign Application Priority Data

Jul. 4, 2005 (JP) ............................. 2005-194638

(51) Int. Cl.
*F21V 8/00* (2006.01)
(52) U.S. Cl. ...................... 362/619; 362/617
(58) Field of Classification Search ................ 362/617, 362/619, 620
See application file for complete search history.

(56) References Cited

U.S. PATENT DOCUMENTS

2004/0080927 A1* 4/2004 Parker et al. ................... 362/31
2004/0114347 A1* 6/2004 Leu et al. ........................ 362/31

FOREIGN PATENT DOCUMENTS

| JP | 08-006969 | 1/1996 |
|---|---|---|
| JP | 08-122730 | 5/1996 |
| JP | 11-136462 | 5/1999 |
| JP | 2002-228844 | 8/2002 |
| JP | 2002-298626 | 10/2002 |
| JP | 2004-170480 | 6/2004 |

* cited by examiner

*Primary Examiner*—Laura Tso
(74) *Attorney, Agent, or Firm*—Harness, Dickey & Pierce, P.L.C.

(57) ABSTRACT

An optical substrate includes an exit face through which a light entered from an incident face is emitted, a lens forming region provided on the exit face and in which a plurality of microlenses are formed, and a non-lens forming region provided in an area other than the lens forming region on the exit face and surrounded by the microlenses. The microlenses diffuse and emit the light entered through the exit face. The non-lens forming region is used to identify a predetermined direction of the substrate.

8 Claims, 4 Drawing Sheets

OPTICAL SUBSTRATE, MANUFACTURING METHOD THEREOF, PLANAR LIGHTING DEVICE AND ELECTROOPTICAL DEVICE

BACKGROUND OF THE INVENTION

1. Technical Field

The present invention relates to an optical substrate, a manufacturing method thereof, a planar lighting device and an electrooptical device.

2. Related Art

A liquid crystal display device, which is a kind of electrooptical device, typically has a backlight which is a planar lighting device illuminating a plane and provided on the back side of a liquid crystal panel. So called edge-light type backlights are widely used for the liquid crystal display devices since it is possible to make the device thinner with the edge type backlight. In the edge type backlight, light that entered around a side face of the liquid crystal panel is led to the back side of the liquid crystal panel (to the lighting device side) and illuminates the panel.

JP-A-2002-298626 is an example of related art. The edge-light type backlight typically has a light source such as a light emitting diode (LED) and a light guide plate in which the light emitted from the light source is internally reflected and led to the side face of the lighting device (an exit face). Furthermore, the backlight has a diffusing sheet provided on the light exit side of the light guide plate and a reflecting sheet provided on a side (a reflect face) which is the opposite side of the light exit side of the light guide plate in order to equalize and to increase the brightness of the light coming out from the light guide plate.

Light emitted from the light source enters into the light guide plate. The entered light is refracted and reflected between the exit face and the reflect face (or the reflecting sheet), then led to the substantially whole face of the exit face. Light led to the exit face enters the diffusing sheet, is diffused by optical elements (for example, microlenses) formed on the diffusing sheet, and then exits to the lighting device side. In this way, unevenness in the brightness, such as bright points and bright lines in the light guide plate is diffused, and light emitted from the light source can evenly illuminate the liquid crystal panel.

However, the above-described backlight has many members and components (for example, the above mentioned diffusing sheet, the light guide plate, the reflecting sheet and the like) in order to increase the brightness and to equalize the unevenness in the brightness of the illumination. This could be a problem because it reduces the productivity of the backlight. Such problem can be solved by providing the optical elements (for example, microlenses) formed on the diffusing sheet to the light guide plate. In other words, the diffusing sheet can be omitted by providing the light diffusing property directly on the light guide plate. In this way, the number of the members used for the back light can be decreased and it is possible to prevent the productivity of the backlight from being reduced.

Meanwhile, positional orientations of the members in the above-described backlight are decided based on the position of the light source so that it takes time to assemble and the productivity could be reduced. If a mark (for example, an alignment mark) showing an orientation to provide a member is formed on the light guide plate, the assembling process would become easier and the productivity of the backlight would not be reduced. For this reason, forming a part showing the layout orientation of the member such as the alignment mark on the light guide plate has been requested.

However, where it is attempted to form the alignment mark and the like on the light guide plate having the microlens, the microlens could be damaged during the formation process of the alignment mark. In addition, the cost and the number of steps in the process would be increased in order to form the alignment mark. This could reduce the productivity of the light guide plate and the productivity of the backlight could not be improved.

SUMMARY

An advantage of the present invention is to provide an optical substrate on which a microlens and a reference area are provided in order to prevent the productivity from being lowered. The microlens has a light diffusing property and a predetermined alignment orientation can be read from the reference area. Other advantages of the invention are to provide a manufacturing method thereof, a planar lighting device equipped with the optical substrate, and an electrooptical device.

An optical substrate according to a first aspect of the invention includes an exit face through which a light entered from an incident face is emitted, a lens forming region provided on the exit face and in which a plurality of microlenses formed, the microlenses diffusing and emitting the light entered through the exit face, and a non-lens forming region provided in an area other than the lens forming region on the exit face and surrounded by the microlenses. The non-lens forming region being used to identify a predetermined direction of the substrate.

According to the first aspect of the invention, the light entered through the exit face can be diffused and emitted by the lens forming region in which the microlens are formed. A predetermined direction of the optical substrate can be identified with the non-lens forming region which is the area surrounded by the microlenses.

In other words, the non-lens forming region surrounded by the microlenses can serve as an alignment mark on the substrate. Furthermore, it is possible to make a non-forming region in the manufacturing process of the microlens. Consequently, it is possible to identify a certain direction of the substrate (for example, a placing direction and a transfer direction of the substrate, an alignment direction of the lens, a processing direction of the substrate and the like) without deteriorating the productivity of the optical substrate having the microlens.

In this case, the non-lens forming region may be provided in a peripheral area of the exit face.

In this way, the microlenses can be formed in substantially the whole area of the exit face because the non-lens forming region is provided in the peripheral area of the exit face. Accordingly, it is possible to prevent the optical function of the microlens from being lost.

In such optical substrate, the predetermined direction of the substrate may be identified based on a position where the non-lens forming region is provided with respect to the exit face.

According to such optical substrate, the predetermined direction of the optical substrate can be identified by the position of the non-lens forming region regardless of the size and the shape of the non-lens forming. Therefore, a function to identify the predetermined direction can be imparted to the optical substrate with a simple structure.

The non-lens forming region may be provided in a plural number on the exit face.

In this way, it is possible to improve the accuracy of the direction identify function of the substrate as the non-lens forming region is provided in the plural number.

Furthermore, the non-lens forming region may be an area where the substrate is holdable.

In this way, the optical substrate can be held without damaging the microlenses because it is griped at the non-lens forming region. Accordingly, the optical properties of the microlens are secured. At the same time, the forming position and the size of the non-lens forming region can be secured.

The substrate may be a light guide plate leading a light entered through the incident face to the exit face.

In this way, the light emitted from the light guide plate can be diffused by the microlenses, and the placing direction, the transfer direction and the like of the light guide plate can be identified by the non-lens forming region surrounded by the microlenses.

A method of manufacturing an optical substrate according to a second aspect of the invention includes a step of discharging droplets containing a lens forming material to a lens forming area provided on an exit face of a substrate, a step of forming a plurality of microlenses by curing the droplets landed in the lens forming area, the microlenses diffusing the light that goes out through the exit face; and a step of forming a non-lens forming region by surrounding an area in the exit face with the microlenses formed in the lens forming area. The non-lens forming region being used to identify a predetermined direction of the substrate.

According to the second aspect of the invention, the microlens and the non-forming region can be made by discharging and curing droplets. Therefore, the microlens and the non-lens forming region can be simultaneously made by the simple method. Furthermore, it is possible to identify a certain direction of the optical substrate with the non-lens forming region. Consequently, it is possible to identify the certain direction of the substrate (for example, a placing direction and a transfer direction of the substrate, an alignment direction of the lens, a processing direction of the substrate and the like) without deteriorating the productivity of the optical substrate having the microlens.

A planar lighting device according to a third aspect of the invention includes a light source and the above-described optical substrate manufactured by the above-described method. A light led to the incident face from the light source is emitted through the exit face.

According to the third aspect of the invention, it is possible to identify the certain direction of the substrate without deteriorating the productivity of the optical substrate, so that the productivity of the planar lighting device can also be improved.

An electrooptical device according to a forth aspect of the invention modulates a light from a planar lighting device, emits the light and includes the above-described planar lighting device.

According to the forth aspect of the invention, it is possible to provide the electrooptical device with an improved productivity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
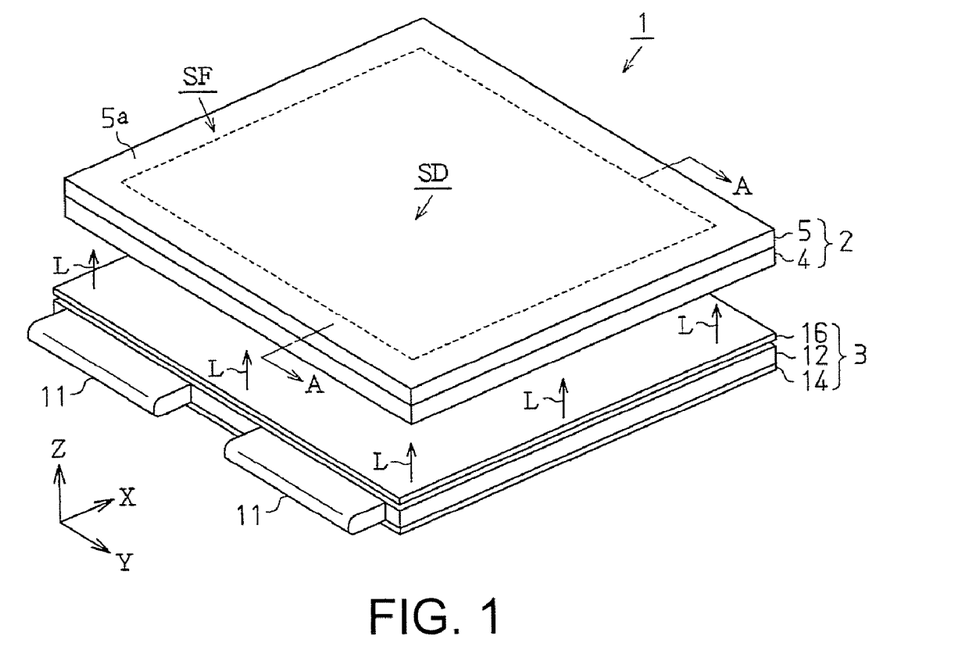
FIG. 1 is a schematic perspective view of a liquid crystal display device according to an embodiment of the invention.
Figure 2:
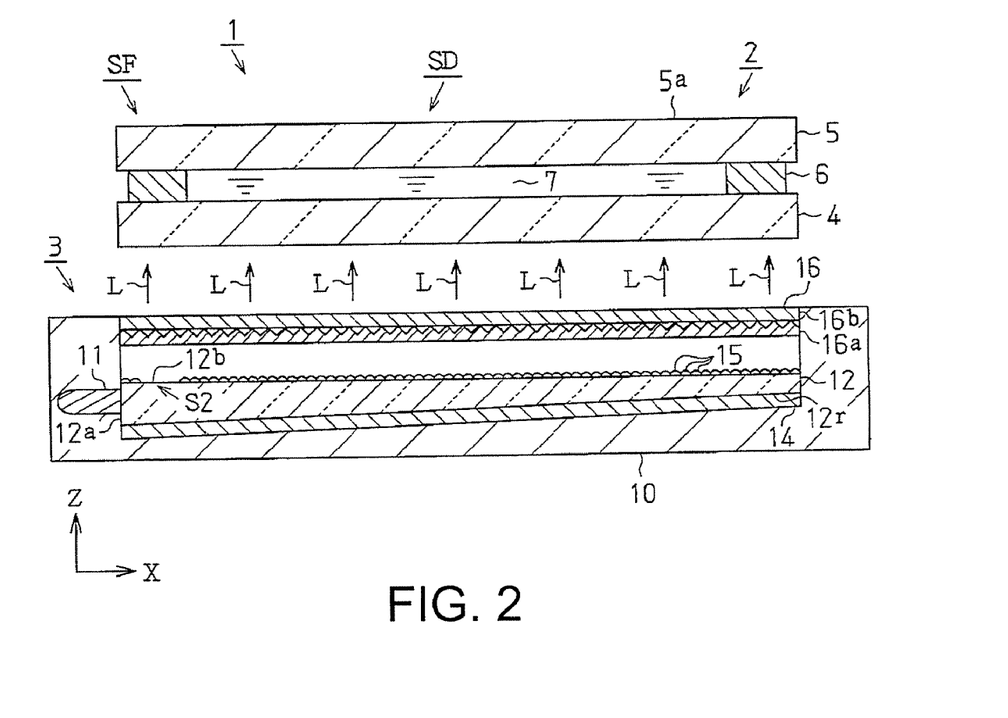
FIG. 2 is a schematic sectional view of the liquid crystal display devic.

An embodiment of the invention will be described with reference to FIG. 1 through FIG. 6. First of all, a liquid crystal display device, which is a kind of electrooptical device, according to the embodiment of the invention is described. FIG. 1 is a schematic perspective view of the liquid crystal display device and FIG. 2 is a sectional view along the line A-A in FIG. 1.

As shown in FIG. 1, a liquid crystal display device 1 has a liquid crystal panel 2 and a backlight 3 which is a planar lighting device illuminating the liquid crystal panel 2 with a illumination light L.

The liquid crystal panel 2 includes a glass substrate (an opposing substrate 4) having a square plate shape and provided on the side of the backlight 3. Another glass substrate (an element substrate 5) that opposes the opposing substrate 4, and a sealing member 6 (see FIG. 2) that adheres the two glass substrates and is interposed therebetween. Liquid crystal 7 is enclosed between the opposing substrate 4 and the element substrate 5 and alignment state of the liquid crystal 7 can be controlled based on a display data outputted from a control circuit (not shown). A display area SD facing the liquid crystal 7 is formed on a top face 5a (a face opposing the opposing substrate 4) of the element substrate 5.

The illumination light L emitted from the backlight 3 is modulated according to the alignment state of the liquid crystal 7. A desired image can be displayed in the display area of the liquid crystal panel 2 according to the modulated illumination light L that passes through a polarizing plate (not shown).

In this embodiment, the area outside the display area SD in the top face 5a of the element substrate 5 is called a non-display area SF as shown in FIG. 1. The liquid crystal display device 1 is an active matrix type liquid crystal display device having control elements and pixel electrodes arranged in matrix on the side face of the element substrate 5 which is closer to the opposing substrate 4 in this embodiment. However, the liquid crystal display device 1 may be a passive matrix type liquid crystal display device and the like. Furthermore, the opposing substrate 4 is provided on the side of the backlight 3 in the liquid crystal display device 1 according to the embodiment. However, the case is not limited to this. For example, the element substrate 5 may be provided on the side of the backlight 3.

The backlight 3 in this embodiment is a so called edge-type backlight that has a light source 11 such as an LED at the one end of a case 10 having substantially a box shape as shown in FIG. 2. A light emitted from the light source 11 is led to one direction of the light source 11 (X-arrow direction in FIG. 2) through a reflector (not shown).

A light guide plate 12, which is the optical substrate, is provided on the X arrow direction side of the light source 11. The light guide plate 12 is a light-transmissive substrate having a square shape whose size is substantially the same as that of the opposing substrate 4 when it is seen from the liquid crystal panel 2 side. The light guide plate can be made of transparent resin materials such as acrylic resins, a polycarbonate, a polyester and the like or inorganic transparent materials such as glass, quartz and the like.

In this embodiment, the side face of the light guide plate 12 which is closer to the light source 11 is called an incident face 12a. The face of the light guide plate 12 which is closer to the liquid crystal panel 2 is called an exit face 12b. The face of the light guide plate 12 which opposes the exit face 12b is called a reflecting face 12r.

The reflecting face 12r of the light guide plate 12 is formed so as to incline towards the liquid crystal panel 2 (upward: the Z arrow direction) according to the distance from the light source 11 (the X arrow direction). In other words, the distance between the reflecting face 12r and the exit face 12b gradually becomes smaller along the X arrow direction. A plurality of reflecting dots and reflecting grooves (not shown) are formed on the reflecting face 12r of the light guide plate 12 The reflecting dots and reflecting grooves are formed in order to guide the light entered from the incident face 12a towards the exit face 12b. A reflecting sheet 14 having a reflecting property and made of aluminum and the like is provided beneath the reflecting face 12r.

The light of the light source 11 entered into the inside of the light guide plate 12 is reflected and deflected between the exit face 12b and the reflecting face 12r, and travels inside the light guide plate 12. The light leaked from the reflecting face 12r is reflected towards the exit face 12b by the reflecting sheet 14. In other words, the light emitted by the light source 11 is led to the exit face 12b from the incident face 12a and a component of the light that exceeds the critical angle with respect to the exit face 12b comes out from substantially the whole surface of the exit face 12b.

As described above, the light guide plate 12 according to the embodiment, can make the light emitted by the light source 11 exit from substantially the whole area of the exit face 12b because the incident face 12a and the reflecting face 12r, respectively, oppose the light source 11 and the reflecting sheet 14.

Figure 3:
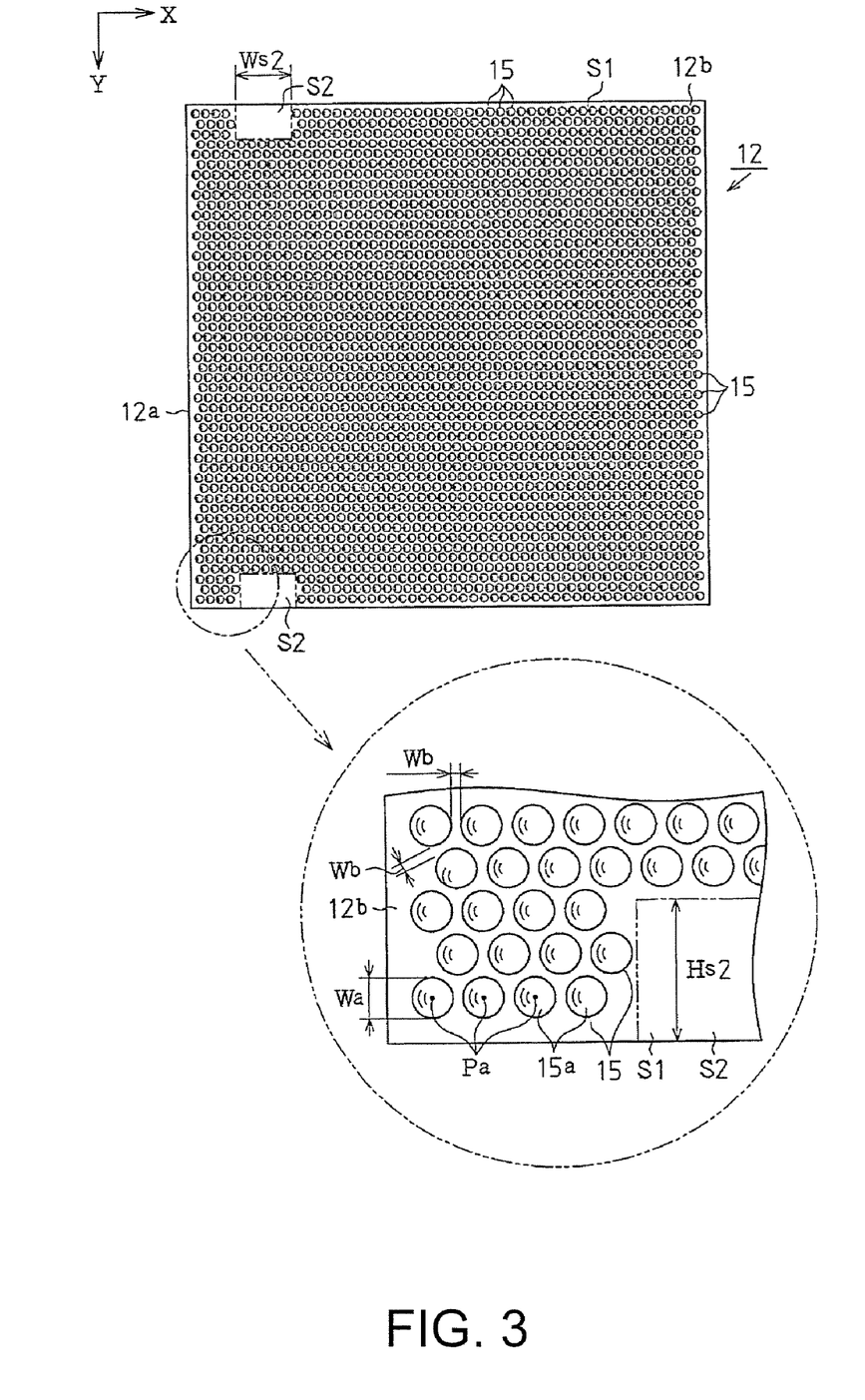
FIG. 3 is a plan view for describing a light guide plate according to the embodiment of the invention.

A microlens 15 is formed on the exit face 12b of the above-mentioned light guide plate 12 as shown in FIG. 3. The microlens 15 is provided in a plural number and in a certain pattern.

The microlens 15 is a convex lens having a lens face 15a that protrudes from the exit face 12b and a hemisphere shape with an outside diameter (a lens diameter Wa) of about 50 μm. Each microlens 15 has a different refractive index from that of the light guide plate 12. The light entered into the microlens from the exit face 12b is refracted in the lens and it is led to the lens face 15a. In the lens face 15a, the light is once collected at the upper side of the microlens 15 and then diffused under a hereinafter described prism sheet 16 (see FIG. 2). The lens face 15a is formed so as to have a lens coefficient with which the direction where the diffused light most intensely illuminates will face the most appropriate direction of the hereinafter described prism sheet 16.

As described above, the light from the exit face 12b is led to the microlens 15. The light entered into each microlens 15 is refracted and diffused by the exit face 12b. The light is further refracted and diffused by the lens face 15a when it comes out from the microlens 15. In other words, the light entering the microlens 15 is diffused (equalized) by the exit face 12b and the lens face 15a, and the diffusing angle of the light is increased. The diffused light by the microlens 15 diffuses the bright spots, the bright lights and the unevenness in the brightness formed by the reflection at the reflecting face 12r. Thus the brightness is equalized. The light is led in such a way that the direction where the intensity of the light is largest becomes most appropriate for the hereinafter described prism sheet 16.

As shown in FIG. 3, the center position of the above-mentioned microlens 15 provided on the exit face 12b is called a targeted discharge position Pa in this embodiment.

The above-mentioned microlenses 15 are densely arranged in an equilateral triangle lattice pattern as shown in FIG. 3 and the distance (interval distance Wb) between two adjacent microlenses 15 is about 3.5 μm. In this embodiment, the area where the plurality of the microlenses 15 is formed in the exit face 12b is called a lens forming area S1. The area where the microlens 15 is not formed in the exit face 12b is called a reference area S2 which is a non-lens forming region.

More specifically, the plurality of the microlenses 15 is formed on substantially the whole surface of the exit face 12b so as to surround a pair of the reference areas S2 that are located in the peripheral area of the exit face 12b along the X arrow direction and on the incident face 12a side.

In other words, the reference area S2, which enables the position of the incident face 12a to be recognized through the exit face 12b, is formed such that only this area has a flat and smooth surface and is exposed in the incident face 12a side. The reference area S2 formed in the incident face 12a side is surrounded by the plurality of the protruding microlenses 15 and the reference area S2 serves as an alignment mark that indicates the positional direction of the incident face 12a of the light guide plate 12.

The position of the reference area S2 in the exit face 12b can be recognized because the above-mentioned pair of the reference areas S2 is surrounded by the above-mentioned lens forming area S1 (the microlens 15) where is patterned to be a convexity. With this reference area S2, it is possible to recognize the direction of the incident face 12a with reference to the exit face 12b. This means that the positional direction of the incident face 12a in the light guide plate 12 can be identified.

In this way, in the light guide plate 12 according to the embodiment, it is possible to identify the positional direction of the incident face 12a by forming the reference area S2 that is surrounded by the plurality of the microlenses 15 formed in the lens forming area S1, without separately forming an alignment mark and the like on the light guide plate 12. With such reference area S2, the backlight 3 can be assembled in such a way that the incident face 12a and the reflecting face 12r respectively oppose the light source 11 and the reflecting sheet 14.

The reference area S2 in this embodiment is formed in a size that can be recognized with eyes. The width (a width Hs2) of the reference area S2 in a Y arrow direction corresponds to the non-display area SF in the above-mentioned liquid crystal panel 2. In other words, the lens forming region S1 has the plurality of the microlenses 15 where corresponds the above mentioned display area SD and has its optical function. The other width (a width Ws2) of the reference area S2 in the X arrow direction is larger than the width Hs2 and this part is formed in such a way that a hereinafter described gripper 46a of a conveying means 46 (see FIG. 6) can hold the reference area S2.

The microlens 15 is formed by the following way using a hereinafter described droplet discharge device 20 (see FIG. 4). A droplet D (see FIG. 4) of a lens forming material F (see FIG. 4) which is a pattern forming material is discharged in each targeted discharge position Pa formed on the exit face 12b of the light guide plate 12. The droplet D disposed on the exit face 12b is then cured and the microlens 15 is formed.

The prism sheet 16 is provided above the microlens 15 as shown in FIG. 2. The prism sheet 16 has a first prism sheet 16a and a second prism sheet 16b that is superimposed on the first prism sheet 16a. The first prism sheet 16a has minuscule linear prisms arranged in array. The second prism sheet 16b also has minuscule linear prisms that are arranged in the orthogonal direction to the direction in which the linear prisms of the first prism sheet are arranged. With this prism sheet 16, the light in the direction of the maximum intensity from the microlens 15 is led to the liquid crystal panel 2 by deflection of the first prism sheet 16a and the second prism sheet 16b.

When the light from the microlens 15 comes out to the prism sheet 16, the light entering the prism sheet 16 is deflected by the prism sheet 16 and its maximum intensity direction is directed to the liquid crystal panel 2. In this way, the light illuminates the liquid crystal panel 2 as the illumination light L.

Here, the evenness in the brightness of the illumination light L illuminating the liquid crystal panel 2 is improved by the diffusion by the microlens 15 formed on the exit face 12b. Furthermore, the luminosity of the illumination light L is also improved because the microlens 15 is directly formed on the exit face 12b of the light guide plate 12 and the light traveled through the microlens 15 is appropriately directed to the prism sheet 16.

Accordingly, according to the embodiment, it is possible to improve the brightness and the evenness in the brightness of the illumination light L without separately providing a diffusing sheet and the like to diffuse the light from the light guide plate 12 in the back light 3. Therefore, the display quality of the liquid crystal display 1 can be improved. This means that the backlight 3 (the liquid crystal display 1), according to the embodiments, does not need the diffusing sheet and the like so that the number of the components in the backlight 3 can be reduced and the productivity can be improved.

Next, a manufacturing method of the above-described light guide plate 12 will be described.

Firstly, a droplet discharge step is carried out. In the droplet discharge step, the droplet D is discharged on the exit face 12b (targeted discharge position Pa) of the light guide plate 12. FIG. 4 is an explanatory drawing for describing the droplet discharge device 20 that discharged the droplet D on the exit face 12b of the light guide plate 12.

Figure 4:
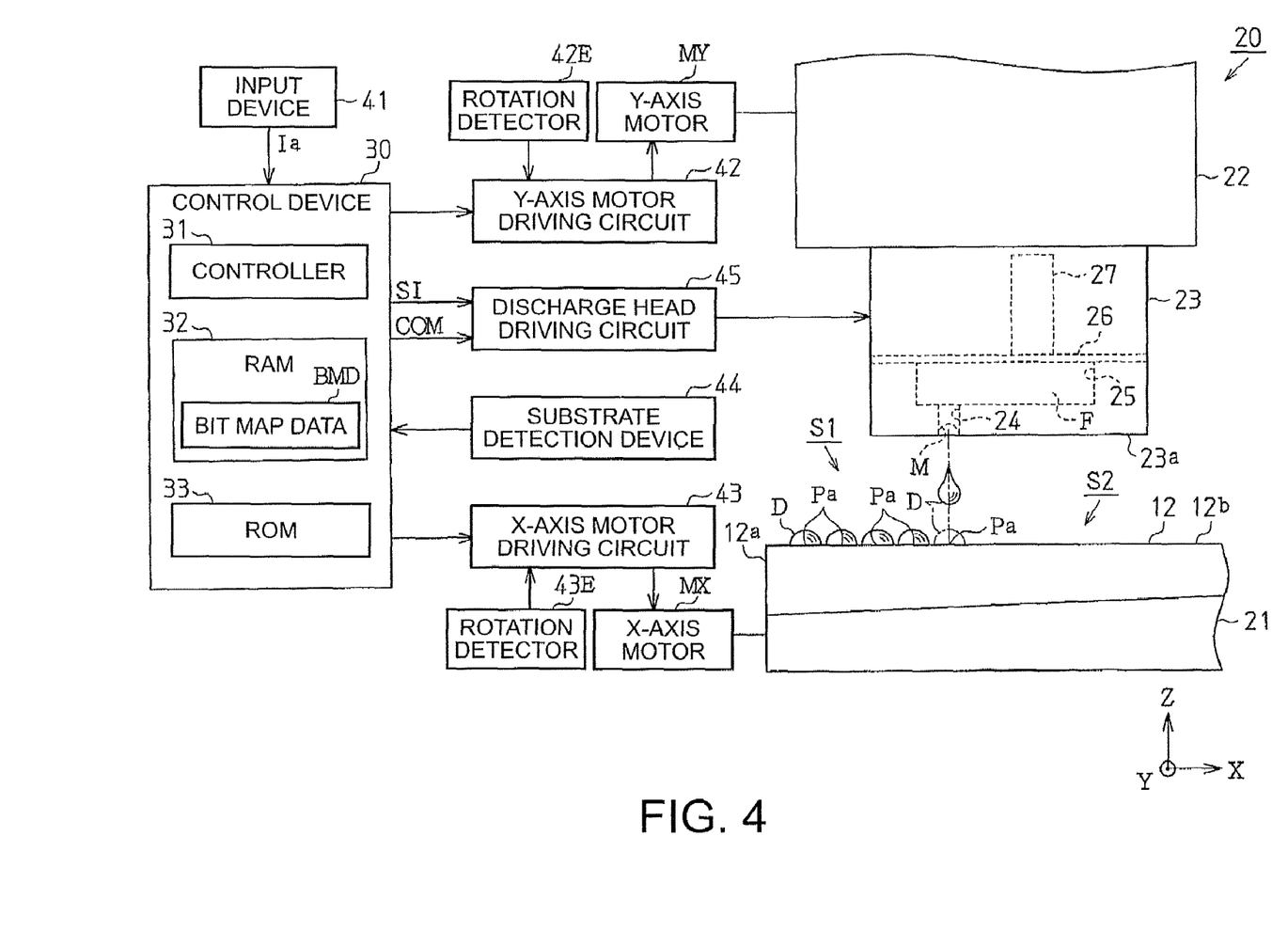
FIG. 4 is an explanatory drawing for a manufacturing process of the light guide plate.

The droplet discharge device 20 has a substrate stage 21 that supports the light guide plate 12 in a predetermined position with the exit face 12b facing upward as shown in FIG. 4. An X-axis motor MX is coupled to the stage 21 so that the stage 21 can move toward the X arrow direction and the counter X arrow direction (in X axis direction) when it is driven by the motor.

Above the light guide plate 12 mounted on the substrate stage 21, a carriage 22 is provided. A Y-axis motor MY is coupled to the carriage 22 so that the carriage 22 can move toward the Y arrow direction and the counter X arrow direction (in Y axis direction) when it is driven by the motor. Under the carriage 22, a droplet discharge head 23 (hereinafter simply called "discharge head") that opposes the exit face 12b is provided.

The discharge head 23 has a rectangular parallelepiped shape extending in the Y arrow direction and a plurality of discharge nozzles (hereinafter called "discharge nozzle 24") that is arranged in line in the Y arrow direction is formed on the bottom face (a nozzle formed face 23a). The discharge nozzle is formed such that the hole of the nozzle extends in the Z arrow direction. The nozzle 24 in this embodiment is placed such that the nozzle can face each targeted discharge position Pa on the exit face 12b when the exit face 12b moves in the X arrow direction.

A cavity 25 is respectively formed in the counter Z arrow direction of each nozzle 24. The cavity 25 provides the corresponding nozzle 24 with the lens forming material F supplied from an unshown storage tank. The lens forming material F used in the embodiment is a non-solvent material that does not include organic solvents such as ultraviolet curing resins including ultraviolet curing acrylic resins and ultraviolet curing epoxy resins. More specifically, the ultraviolet curing resins contain at least one of a prepolymer, an oligomer and a monomer, and a photo polymerization initiator.

Such prepolymer and oligomer include, for example, acrylates such as epoxyacrylates, urethaneacrylates, polyesteracylates, polyetheracrylates and spiroacetalacrylates, methacrylates such as epoxymethacrylates, urethanmethacrylates, polyestermethacrylates and polyethermethacrylates and the like.

Such monomer includes, for example, monofunctional monomers such as 2-ethylhexyl acrylate, 2-ethylhexyl methacrylate. 2-hydroxyethyl acrylate, 2-hydroxyethyl methacrylate, N-binyl-2-pyrrolidone, a carbitol acrylate, a tetrahydro furfuryl acrylate, a isobonyl acrylate, a dicyclopentenyl acrylate and a 1, 3-butanediol acrylate, and polyfunctional monomers such as 1,6-hexanediol acrylate, 1,6-hexanediol methacrylate, neopentyl glycol diacrylate, polyethylene glycol diacrylate, trimethylolpropane trimethacrylate, pentaerythritol triacrylate and dipentaerythritol hexaacrylate, and the like.

The photo polymerization initiator includes, for example, radical release compounds of acetophenones such as 2,2-dimethoxy-2-phenyl acetophenone, butylphenones such as α-hydroxyisobutylphenone and p-isopropyl-α-hydroxy-isobutylphenone, halogenated acetophenones such as p-tert-butyldichloro acetophenone, p-tert-butyltrichloro acetophenone and α-α-dichloro-4-phenoxy acetophenone, benzophenones such as a benzophenone and N,N-tetraethyl-4,4-diaminobenzophenone, benzyls such as a benzyl, and benzyl dimethyl ketal, benzoins such as a benzoin and benzoin alkyl ether, oximes such as 1-phenyl-1,2-propanedione-2-(o-ethoxycarbonyl) oxime, xanthones such as 2-methyltioxanthone and 2-chlorotioxanthone, Michler's ketones and the like.

An oscillating plate 26 is provided in the Z arrow direction in each cavity 25 so as to oscillate in the Z arrow direction and the counter Z arrow direction. The oscillating plate can increase or decrease the volume of the cavity 25. Above the oscillating plate 26, a piezoelectric element 27 is respectively provided to each nozzle 24. The piezoelectric element 27 expands and contracts with a predetermined driving signal (a piezoelectric element driving signal COM) that is for discharging the droplet D which will be hereinafter described. The oscillating plate 26 is moved in the Z arrow direction and the counter Z arrow direction as the piezoelectric element 27 expands and contracts, increasing or decreasing the pressure in the cavity 25.

When the piezoelectric element driving signal COM is supplied to the piezoelectric element 27, the pressure in the corresponding cavity 25 is increased and decreased, and an interface (a meniscus M) of the lens forming material F in the corresponding nozzle moves up and down. When the meniscus M vertically oscillates this way, a part of the lens forming material F that forms the meniscus M is discharged in the form of the droplet D. The droplet D discharged through the nozzle 24 flies along the counter Z arrow direction and then lands on the exit face 12b that opposes the nozzle 24.

Next, an electrical structure of the above-mentioned droplet discharge device 20 is described.

In a control device 30, a controller 31 including a central processing unit (CPU) and so on, a random access memory (RAM) 32 that includes a dynamic RAM (DRAM) and a static RAM (SRAM) and stores various data, a read only memory (ROM) 33 storing various data and control programs and the like are provided. The controller 31, the RAM 32 and the ROM 33 are coupled to each other through a bus (not shown).

An input device 41 that has operational switches such as a start switch and a stop switch is coupled to the control device 30. The input device 41 outputs a specified drawing data 1a of each targeted discharge position Pa on the exit face 12b to the control device 30. The control device 30 (the controller 31) expands the drawing data Ia from the input device 41 in a specified way and generates a bit map data BMD which shows whether the droplet D should be discharged or not in a two-dimensional drawing plane. The generated bit map data BMD is stored in the RAM. In other words, the control device 30 stores the bit map data BMD in the RAM, the bit map data BMD indicates that the droplet D is discharged to each targeted discharge position Pa in the lens forming region S1 but the droplet D is not discharged in the reference area S2. The bit map data BMD in this embodiment decides to turn the piezoelectric element 27 on or off (the droplet D is discharged or not) according to the value of each bit (0 or 1).

The controller 31 synchronizes the bit map data BMD with a provided clock signal and transfers the data of the every scanning (each shift of the substrate stage 21) to a hereinafter-described discharge head driving circuit 45 as a discharge control signal SI.

The controller 31 expands the drawing data Ia from the input device 41 in a different way from the expansion process of the bit map data BMD and then generates the piezoelectric element driving signal COM for discharging a predetermined sized droplet D. The controller 31 outputs the piezoelectric element driving signal COM to the hereinafter-described discharge head driving circuit 45.

A Y-axis motor driving circuit 42 is coupled to the control device 30. The control device 30 outputs a Y-axis motor driving control signal to the Y-axis motor driving circuit 42. The Y-axis motor driving circuit 42 rotates the Y-axis motor MY either in a normal direction or a reversal direction according to the Y-axis motor driving control signal from the control device 30. A rotation detector 42E is coupled to the Y-axis motor driving circuit 42 and a detection signal from the rotation detector 42E is inputted into the Y-axis motor driving circuit 42. The Y-axis motor driving circuit 42 detects the rotation direction and a degree of the rotation of the Y-axis motor MY when the Y-axis motor driving circuit 42 receives the detection signal from the rotation detector 42E. The Y-axis motor driving circuit 42 then calculates a travel distance of the carriage 22 in the Y-arrow direction and a moving direction of the carriage 22

An X-axis motor driving circuit 43 is coupled to the control device 30. The control device 30 outputs an X-axis motor driving control signal to the X-axis motor driving circuit 43. The X-axis motor driving circuit 43 rotates the X-axis motor MX either in a normal direction or a reversal direction according to the X-axis motor driving control signal from the control device 30. A rotation detector 43E is coupled to the X-axis motor driving circuit 43 and a detection signal from the rotation detector 43E is inputted into the X-axis motor driving circuit 43. The X-axis motor driving circuit 43 detects the rotation direction and a degree of the rotation of the X-axis motor MX when the X-axis motor driving circuit 43 receives the detection signal from the rotation detector 43E. The X-axis motor driving circuit 43 then calculates a travel distance of the substrate stage 21 (the light guide plate 12) in the X-arrow direction and a moving direction of the substrate stage 21.

A substrate detection device 44 is coupled to the control device 30. The substrate detection device 44 detects the edge of the light guide plate 12 and this is used when the control device 30 estimates the position of the light guide plate 12 (the targeted discharge position Pa) that passes under the above-mentioned discharge head 23 (the nozzle 24).

The discharge head driving circuit 45 is coupled to the control device 30. The control device 30 outputs the discharge control signal SI and the piezoelectric element driving signal COM to the discharge head driving circuit 45. The discharge head driving circuit 45 decides whether to supply the piezoelectric element driving signal COM to the corresponding piezoelectric element 27 or not according to the discharge control signal SI from the control device 30.

Next, a droplet discharge process using the above-mentioned droplet discharge device 20 is described.

Firstly, the light guide plate 12 with the exit face 12b facing upward is placed and fixed on the substrate stage 21. At this point, the substrate stage 21 places the incident face 12a of the light guide plate 12 in the X-arrow side of the discharge head 23.

The drawing data la for discharging the droplet D of the lens forming material F is inputted in this state and then an operation signal is inputted in order to start a droplet discharge program. Subsequently, the control device 30 generates the bit map data BMD for discharging the droplet D to the targeted discharge position Pa (the lens forming region S1) on the exit face 12b based on the drawing data la from the input device 41. The control device 30 then stores the generated bit map data BMD in the RAM. After storing the bit map data BMD, the control device 30 generates the piezoelectric element driving signal COM based on the drawing data Ia and outputs the piezoelectric element driving signal COM to the discharge head driving circuit 45.

Subsequently, the control device 30 controls and drives the Y-axis motor MY so as to move the carriage 22. The carriage is placed in such a way that the targeted discharge position Pa on the plate passes under the nozzle 24 when the light guide plate 12 moves in the X-arrow direction.

After setting the carriage 22, the control device 30 drives the X-axis motor MX so as to move the substrate stage 21 in the counter X-arrow direction. When the substrate detection device 44 detects the edge of the light guide plate 12 on the X-arrow side (the incident face 12a), the detection signal is sent from the rotation detector 43E to the control device 30. The control device 30 then performs a calculation to find out whether the targeted discharge position Pa that is the furthest in the X-arrow direction side is placed directly under the corresponding nozzle 24 or not. After that, the control device 30 waits the timing at which the discharge control signal SI based on the bit map data BMD stored in the RAM 32 is outputted to the discharge head driving circuit 45.

When the targeted discharge position Pa that is the furthest in the X-arrow direction side is placed directly under the corresponding nozzle 24, the control device 30 outputs the discharge control signal SI to the discharge head driving circuit 45 according to the detection signal from the rotation detector 43E. When the discharge head driving circuit 45 receives the discharge control signal SI from the control device 30, it supplies the piezoelectric element driving signal COM to the corresponding piezoelectric element 27 based on the discharge control signal SI. The discharge head driving circuit 45 then makes the corresponding nozzle 24 discharge the droplet D toward the corresponding targeted discharge position Pa in the Z-arrow direction. The circuit can make a plurality of the nozzles simultaneously discharge droplets. The discharged droplet D lands on the targeted discharge position Pa that is the furthest in the X-arrow direction side in the lens forming region SI and forms a hemisphere that protrudes from the exit face 12b.

Hereafter, the same process is repeated. The control device 30 makes the corresponding nozzle 24 discharge the droplet D each time the targeted discharge position Pa is placed right under the nozzle 24 as the control device 30 moves the substrate stage 21 in the X-arrow direction. The droplets D are provided to all the targeted discharge positions Pa in the lens forming region S1. When the droplets D have been provided to all the targeted discharge positions Pa so as to surround the reference area S2, the control device 30 moves the substrate stage 21 away from the carriage 22, and then the droplet discharge operation is ended.

After the droplet discharge process, a droplet curing process in which the droplet D formed on the exit face 12b is cure is performed.

The conveying means 46 (see FIG. 6) that has the gripper 46a such as a clamp holds the reference area S2 of the light guide plate 12. The light guide plate 12 placed on the substrate stage 21 is then transferred into a certain ultraviolet irradiation device. Because the reference area S2 is formed in the size with which the gripper 46a of the conveying means 46 can securely hold the light guide plate 12, the light guide plate 12 can be securely transferred to the ultraviolet irradiation device without damaging the shape of the droplet D and as avoiding a transfer error and the like.

Figure 5:
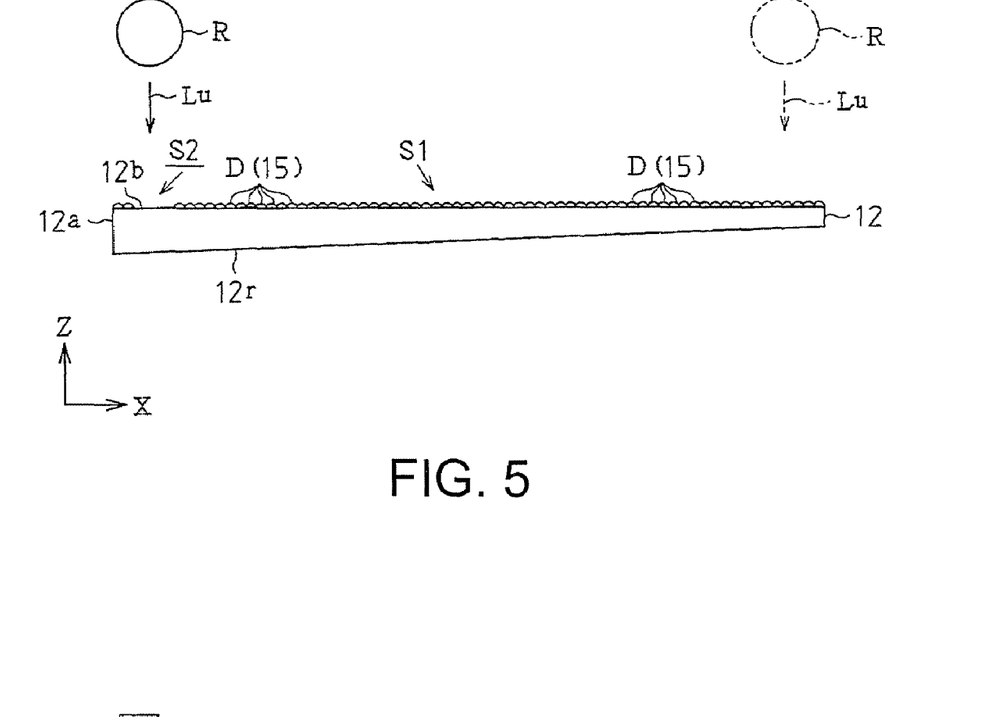
FIG. 5 is an explanatory drawing for the manufacturing process of the light guide plate.

After the light guide plate 12 is transferred in the ultraviolet irradiation device, an ultraviolet lamp R sequentially irradiates ultraviolet Lu to an area that starts around the reference area S2 on the exit face 12b and along the X-arrow direction as shown in FIG. 5. In this way, the droplet D in each targeted discharge positions Pa is cured.

Each droplet D formed on the exit face 12b is sequentially irradiated with the ultraviolet Lu in the discharged order since the reference area S2 is formed on the side of the first droplet that was initially discharged (on the side of the incident face 12a). This means that each droplet D is hardened at the similar timing with the time course after the droplet is discharged and spreads out on the plate according to the irradiation order of the ultraviolet Lu. Therefore, it is possible to form the similar sized microlens 15 at the targeted discharge positions Pa on the exit face 12b, and the light guide plate 12 having the reference area S2 surrounded by such microlenses 15 can be manufactured.

Figure 6:
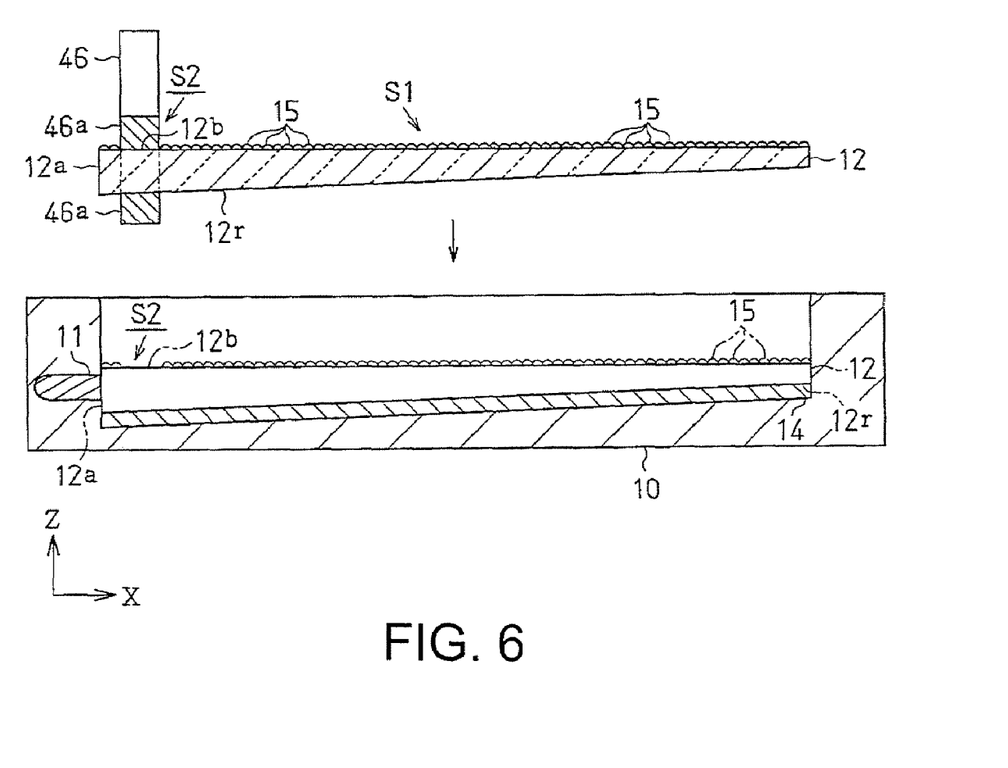
FIG. 6 is an explanatory drawing for describing a mechanism of the light guide plate.

Next, assembly of the back light 3 having the above-mentioned light guide plate 12 is described. FIG. 6 is an explanatory drawing for describing how to assemble the back light 3.

Firstly, as indicated in full line in FIG. 6, the conveying means 46 that has the gripper 46a such as a clamp holds the reference area S2 of the light guide plate 12 on which the microlens 15 is formed. The light guide plate 12 is then placed in the case 10 in which the light source 11 and the reflecting sheet 14 are already placed in such a way that the reference area S2 of the light guide plate 12 positions on the light source 11 side as indicated in dashed-two dotted line in FIG. 6.

Since the reference area S2 is formed in the size with which the gripper 46a of the conveying means 46 can securely hold the light guide plate 12, the light guide plate 12 can be securely placed in the case 10 without damaging the microlens 15, thus, avoiding a transfer error and the like. Furthermore, the incident face 12a and the reflecting face 12r of the light guide plate 12 respectively opposes the light source 11 and the reflecting sheet 14 because the reference area S2 is formed on the incident face 12a side.

Accordingly, the light guide plate 12 having the light diffusing property can be placed in a predetermined direction with respect to the light source 11, and the light guide plate 12 can be smoothly placed in the case 10 without damaging the microlens 15.

Advantageous effects of the above-described embodiment are described.

I. According to the above-described embodiment, the plurality of the microlenses 15 is formed on the substantially whole area of the exit face 12b of the light guide plate 12. The light emitted from the exit face 12b is diffused toward the liquid crystal panel side 2 and a part of the light having the maximum intensity is appropriately directed for the prism sheet 16. The reference area S2 on the exit face 12b is surrounded by the microlenses 15. The reference area S2 has a flat face and exposed in the exit face 12b. The reference area S2 serves as the alignment mark which indicates the direction of the incident face 12a by its position.

Therefore, it is possible to identify the position where the reference area S2 is formed on the exit face 12b and to identify the position where the incident face 12a is formed with respect to the exit face 12b. In other words, it is possible to find the position where the incident face 12a is formed without separately providing an alignment mark and the like. Accordingly, it is possible to securely oppose the incident face 12a and the reflecting face 12r of the light guide plate 12 respectively with the light source 11 and the reflecting sheet 14.

Consequently, a function to indicate its placing position can be imparted to the light guide plate 12 in the step of imparting the light diffusing property to the light guide plate. This means that the placing direction of the light guide plate can be made apparent without impairing the productivity of the light guide plate 12 having the light diffusing property Furthermore, it is possible to improve the productivities of the backlight S and the liquid crystal display device 1.

II. According to the above-described embodiment, the reference area S2 is provided in the peripheral area of the exit face 12b which opposes the non-display area SF so that the lens forming region S1 opposes the display area SD. Therefore, it is possible to impart the discrimination of the reference area S2 to the light guide plate 12 without imparting the optical properties (the brightness and the evenness in the brightness of the backlight 3) of the lens forming region S1 (the microlens 15).

III. The reference area S2 is formed in the size with which the gripper 46a of the conveying means 46 can securely hold the light guide plate according to the above-described embodiment. Therefore, it is possible to prevent the shape of the droplet D formed on the light guide plate 12 and the microlens 15 from being damaged and to avoid the transfer error of the light guide plate 12. It is also possible to prevent particles from being generated due to, the breakage of the microlens 15. As a result, it is possible to improve the productivity of the light guide plate 12 and the productivity of the liquid crystal display device 1.

IV. According to above-described embodiment, a pair of the reference areas S2 is formed in the Y-arrow direction of the exit face 12b. The placement direction of the light guide plate 12 can be easily identified since the two reference areas S2 are provided. Therefore, the light guide plate 12 can be further stably transferred. Moreover, it is possible to improve the productivity of the light guide plate 12 and the productivity of the backlight 3.

V. According to above-described embodiment, the droplet D is started to be discharged at a position closer to the reference area S2 on the light guide plate 12 (the incident face 12a side), and the droplets are sequentially irradiated with the ultraviolet Lu according to the order in which the droplet D is discharged. Therefore, deformation of the droplet D caused by the excessive spread of the droplet D can be prevented and the uniform sized microlens 15 can be formed.

Modification examples of the above-described embodiment are described as follows.

Though the direction of the incident face 12a with respect to the light guide plate 12, the discharge order of the droplet D and the irradiation order of the ultraviolet Lu are identified with the reference area S2 in the above-described embodiment, the case is not limited to this. For example, the microlenses 15 may be aligned in one direction and this aligning direction of the microlens 15 can be identified by the reference area S2. Moreover, a direction in which the optical substrate is post processed (for example, a cleaning process) may be identified in the same way. In other words, the reference area S2 is the area which makes it possible to identify a certain direction concerning the optical substrate.

Though the direction of the incident face 12a with respect to the light guide plate 12, the discharge order of the droplet D and the irradiation order of the ultraviolet Lu are identified by the position of the reference area S2 in the above-described embodiment, the case is not limited to this. For example, the direction of the incident face 12a with respect to the light guide plate 12, the discharge order of the droplet D and the irradiation order of the ultraviolet Lu may be identified based on the figure of the reference area S2, the number of the reference area S2 and the like.

Though the reference area S2 is formed in the visible square shape and with the size that corresponds to the size of the non-display area SF of the liquid crystal panel 2 in the above-described embodiment, the case is not limited to this. For example, the reference area S2 may be formed with a size in which the reference area S2 cannot be recognized with eyes and it can be read out by a scanning device that can find out whether the microlens is formed or not.

Alternatively, the reference area S2 may be formed with a size corresponding to the size of the whole area of the non-display area SF, and the direction of the incident face 12a with respect to the light guide plate 12 can be identified by the position where the microlens 15 surrounding the reference area S2 is formed. In this case, it is possible to decrease the number of the microlenses 15 formed on the exit face 12b, and the amount of the lens forming material F used to a structure which enables the placing direction of the incident face 12a to be identified can be reduced.

Though the two reference areas S2 are formed on the peripheral area of the exit face 12b in the above-described embodiment, only one or more than two reference areas S2 may be provided. In other words, the reference area S2 can function as long as it is formed in the number, the shape and the size with which the position of the incident face 12a with respect to the light guide plate 12 by being surrounded by the microlenses 15.

Though the microlens 15 had the hemisphere shape in the above-described embodiment, it can be formed in, for example, a concave lens and other lenticular shapes.

Though the lens forming material F was an ultraviolet curing resin in the above-described embodiment, it may be precursor polyimide such as polyamic acid and long chain alkyl ester of the polyamic acid. In this case, it is preferable that the droplet D discharge on the exit face 12b is cured by heat so as to become polyimide resin by an imide reaction.

The droplet D is discharged by the extraction and the contraction of piezoelectric element 27 in the above-described embodiment. However, the case is not limited to this. For example, a resistance heating element may be provided in the cavity 25 and a bubble may be generated by the heating. The droplet D can be pushed out by the bubble and it can be discharged.

Though the optical substrate was the light guide plate for the edge-light type backlight in the above-described embodiment, the optical substrate may be, for example, a diffusing plate for a direct backlight, a diffusing sheet substrate provided in a screen for a projection system, or an optical sheet substrate provided for a building material such as a window glass.

What is claimed is:

1. An optical substrate, comprising:
   a first substrate;
   an exit face of the first substrate through which light entered from an incident face of the first substrate is emitted;
   at least one non-lens forming region provided in a peripheral area on the exit face for identifying a predetermined direction of the first substrate; and
   a plurality of microlenses substantially evenly distributed throughout the exit face other than the at least one non-lens forming region and defining a lens forming region, the microlenses diffusing and emitting the light entered through the incident face.

2. The optical substrate according to claim 1, wherein the predetermined direction of the first substrate is identified based on a position where the at least one non-lens forming region is provided with respect to the exit face.

3. The optical substrate according to claim 1, wherein the at least one non-lens forming region is provided in a plural number on the exit face.

4. The optical substrate according to claim 1, wherein the at least one non-lens forming region is an area where the first substrate is holdable.

5. The optical substrate according to claim 1, wherein the first substrate is a light guide plate leading a light entered through the incident face to the exit face.

6. A method of manufacturing an optical substrate, comprising:
   discharging droplets containing a lens forming material to an exit face of a first substrate;
   forming a plurality of microlenses by curing the droplets landed in the lens forming area, the microlenses diffusing the light that goes out through the exit face; and
   forming at least one non-lens forming region by surrounding a peripheral area in the exit face with the microlenses for identifying a predetermined direction of the first substrate, and
   wherein the plurality of microlenses are substantially evenly distributed throughout the exit face other than the at least one non-lens forming region and define a lens forming region.

7. A planar lighting device, comprising:
   a light source; and
   the optical substrate according to claim 1, wherein a light lead to the incident face from the light source is emitted through the exit face.

8. An electrooptical device modulating a light from a planar lighting device and emitting the light, wherein the planar lighting device is the planar lighting device according to claim 7.

* * * * *